United States Patent Office 2,735,791
Patented Feb. 21, 1956

2,735,791

WATERPROOFING COMPOSITIONS AND THEIR USE IN COATING

Pierre Pascal Peyrot and Jacques Proriol, Lyon, France, assignors to Societe des Usines Chimiques Rhone-Poulenc, Paris, France, a French body corporate No Drawing. Application August 2, 1954,
Serial No. 447,434

Claims priority, application France August 5, 1953

8 Claims. (Cl. 117—161)

This invention relates to waterproofing compositions and to their use for water-proofing fibrous organic materials.

Various water-proofing compositions have been proposed which contain butyl titanate, in some cases associated with organopolysiloxones.

However, the aforesaid compositions based on butyl titanate have the serious disadvantages that they can only be employed in organic solution since the butyl titanate immediately hydrolyses in the presence of water.

According to the present invention a water-proofing composition, particularly suitable for application to fibrous organic materials, comprises an aqueous emulsion containing, calculated on the dry solid content, 20 to 60% (preferably 25 to 50%) by weight of a methyl polysiloxanic resin having a $CH_3:Si$ ratio between 1.3:1 and 1.7:1, 25 to 50% (preferably 25 to 45%) by weight of a methyl polysiloxanic oil having a $CH_3:Si$ ratio between 1.9:1 and 2.1:1 and from 8 to 40% (preferably 8 to 20%) by weight of triethanolamine titanate. It has been found that the aforesaid emulsions applied to fibrous organic material impart an excellent water-proofing effect which is retained over a long period and has a good resistance to washing.

Further, according to this invention, an emulsion as aforesaid is prepared by adding an aqueous solution of triethanolamine titanate to a solution in an organic solvent medium of a methyl polysiloxanic oil and a methyl polysiloxanic resin as just defined and emulsifying the mixture in the presence of an emulsifying agent.

The methyl polysiloxanic resin employed in accordance with the present invention has a $CH_3:Si$ ratio between 1.3:1 and 1.7:1 and preferably between 1.4:1 and 1.6:1. It is generally convenient to obtain it by conventional methods by hydrolysis in an ethereal medium of mixtures of methylchlorosilanes having a suitably chosen $CH_3:Si$ ratio. It is employed in benzene or toluene solution.

The methylpolysiloxanic oil, which has a $CH_3:Si$ ratio between 1.9:1 and 2.1:1, preferably has a kinematic viscosity between 50 and 30,000 centistokes. It may be obtained by the usual methods described in the literature.

The triethanolamine titanate may be prepared, by reaction between a titanic acid ester and triethanolamine. The compound may be employed in the substantially pure state, or the crude product of the reaction dissolved in the alcohol liberated may be employed, which latter mixture may, if desired, contain an excess of triethanolamine.

A convenient method of preparing the waterproofing emulsion in accordance with the present invention comprises first dissolving the oil and the resin in a common solvent or in a mixture of compatible solvents. Organic solvents which may be employed for this purpose include chlorinated hydrocarbons such as carbon tetrachloride, trichloroethylene and methylene chloride or unsubstituted hydrocarbons such as toluene, petrol and decalin. A solution of triethanolamine titanate is then prepared or the crude alcoholic solution referred to above is employed. A parent emulsion containing between 30% and 60% of the dry extract is then prepared by mixing the solution containing the resin and the oil and the solution of triethanolamine titanate with the desired quantity of water and adding any convenient emulsifying agent, for example an oleate or stearate of triethanolamine or of morpholine, a condensation product of an amide and a fatty acid such as the material sold under the name Pluramine S100, or a surface active quaternary ammonium salt. Quantities of emulsifier of from 1% to 5% calculated on the solids content are sufficient for the emulsification, which may be effected by a suitable method. This parent emulsion may be diluted with water at the time of use so as to bring the solids content to a value between 1% and 5%, which is generally a suitable concentration for use.

A convenient method of producing a composition according to the present invention consists in preparing a concentrated aqueous emulsion e. g. (25% by weight) of oil and resin in the presence of an emulsifying agent, and then adding the desired quantity of triethanolamine titanate. The parent emulsion thus obtained keeps well when stored at room temperature, and it is sufficient to dilute it at the time of use with the necessary quantity of water.

Fibrous organic materials which are particularly suitable for waterproofing with the compositions of the present invention, are for example, threads and fabrics of cotton, wool, cellulose acetate, viscose, vinyl compounds, superpolyamides or polyacrylonitrile, leathers during or after treatment with tawing paste and papers. If required, the fabrics may be freed from oil or dressing by the usual methods before treatment with the water-proofing composition.

The water-proofing composition may be applied by any convenient method, e. g. by dipping with agitation followed by a calendering treatment. Calendering, which may be repeated several times, is particularly advantageous in that it causes the water-proofing composition to penetrate thoroughly into the fibre. Conveniently, a dry weight of water-proofing composition of the order of 0.5% to 6% of the weight of the organic fibrous material may be applied. The material may then be heated to a temperature between 100° and 200° C. for a time ranging from 1 minute to 30 minutes depending upon the temperature chosen.

The material thus treated retains its water-proof properties even after having been dry scoured in solvents and after having been vigorously washed with alkaline and/or soapy solutions.

The emulsions according to the present invention may be employed in association with urea-formaldehyde resins or melamine-formaldehyde resins having a low degree of condensation, which are preferably employed in aqueous solution, in the presence of a condensing agent.

The emulsions according to the present invention may also be advantageously associated with other commercial organic water-proofing agents such as alkoxypyridinium salts, after the application of the said water-proofing agents. By such combinations of treatment an increased water-proofing effect is obtained.

The following examples will serve to illustrate the invention. The tests employed to indicate the extent of the water-proofing of the fabrics are the ASTM tests: viz, the hydrostatic Pressure Test—Method II ASTM— D. 583—50 T, and the Spray Test, ASTM—D. 583— 50 T. The hydrostatic pressures are expressed in cm. The parts are given by weight.

Example I

A parent emulsion A was prepared with the following constitution:

| | Parts |
|---|---|
| Triethanolamine titanate | 8 |
| Methylpolysiloxanic oil (CH$_3$:Si=2:1) viscosity 300 cst | 25 |
| Methylpolysiloxanic resin (CH$_3$:Si=1.5:1) 70% solution in toluene | 35 |
| Trichloroethylene | 14 |
| Oleic acid | 0.5 |
| Triethanolamine | 2 |
| Water | 150 |

This parent emulsion was diluted with water to give a working emulsion of solids content 2%.

A cotton poplin fabric was freed from oil and dressing by immersion for one hour in a solution containing 10 g. of soap per litre. After rinsing in hot water and drying, it was dipped for five minutes in the aforesaid working emulsion, removed and centrifuged. The moist specimen was dried for 10 minutes at 150° C. The ASTM tests gave the following values: Pressure, 14.5; spray, 100.

After washing for 45 minutes at 55° C. with a solution containing 0.2% of sodium carbonate and 0.5% of soap, and rinsing, the follow values were obtained: Pressure, 12.5; spray, 90.

Example II

A parent emulsion was prepared similar to emulsion A but containing 15 parts of methyl polysiloxanic oil instead of 25 parts, the proportions of all the other constituents remaining unchanged. This emulsion was diluted with water at the time of use to reduce its solids content to 2%, which is the working emulsion.

A cotton poplin was subjected to the preliminary and water-proofing treatments described in Example I and then to the ASTM tests mentioned. The following results were obtained:

| | Spray | Pressure |
|---|---|---|
| After 20 minutes at 120° C | 100 | 13 |
| After 10 minutes at 150° C | 100 | 14 |

Example III

A nylon fabric was treated with the working emulsion of Example I by the same method. The ASTM tests gave the following results:

| | Spray | Pressure |
|---|---|---|
| After 30 minutes at 100° C | 100 | 12 |
| After 10 minutes at 150° C | 100 | 12 |

Example IV

The following composition B was prepared:

| | Parts |
|---|---|
| Composition B: | |
| Waterproofing product marketed under the name "Zelan AP paste" | 5 |
| Sodium acetate | 0.8 |
| Water | 94.2 |

Three similar specimens of cotton poplin fabric, freed from oil and dressing were respectively dipped and calendered at 35–40° C. in the following compositions:

| | Parts |
|---|---|
| Composition C: | |
| "Zelan AP paste" | 5 |
| Sodium acetate | 0.8 |
| Parent emulsion A (as in Example I) | 4 |
| Water | 90.2 |
| Composition D: | |
| Composition B | 100 |
| Parent emulsion A | 8 |
| Water | 92 |
| Composition E: | |
| Composition B | 100 |
| Parent emulsion A | 12 |
| Water | 188 |

The fabrics were then dried for 15 minutes at 100° C., and then for 10 minutes at 150° C. They were rinsed in a 5% aqueous ammoniacal bath and again dried for 10 minutes at 150° C.

They were subjected to the ASTM tests before and after alkaline washing as defined in Example I. The results are set out in the following table.

| Composition | Before washing | | After washing | |
|---|---|---|---|---|
| | Spray | Pressure | Spray | Pressure |
| C | 100 | 18.5 | 90 | 16.5 |
| D | 100 | 15.5 | 90 | 15 |
| E | 100 | 17.5 | 90 | 17 |

Example V

A cellulose acetate fabric was freed from oil and dressing and rinsed by washing with a hot soap solution, and then dipped for 30 minutes in the following composition:

| | Parts |
|---|---|
| Parent emulsion A | 6 |
| 60% aqueous solution of a dimethylol urea resin obtained by condensation of urea and formaldehyde | 10 |
| Ammonium oxalate | 0.1 |
| Water | 93.9 |

After drying for 30 minutes at 100° C. and for three minutes at 120° C., the material gave a value of 80 on the spray test.

Example VI

A parent emulsion was prepared having the following composition:

| | Parts |
|---|---|
| Methylpolysiloxanic oil (CH$_3$:Si=2:1) viscosity 300 cst | 25 |
| Methylpolysiloxanic resin (CH$_3$:Si=1.5:1) in 70% solution in toluene | 35 |
| Trichloroethylene | 7 |
| Triethanolamine titanate | 15 |
| Pluramine S100 (emulsifying agent) | 2.5 |
| Water | 150 |

This parent emulsion was diluted with water to bring its solids content to 2% and a cotton poplin fabric was treated therewith as in Example I.

After drying the treated fabric for 30 minutes at 100° C., the ASTM tests gave the following results: Spray 100; pressure 11.

Example VII

A mixture of equal weights of triethanolamine and butyl titanate is heated under reflux for 2 hours. The reaction product obtained is referred to as crude triethanolamine titanate in the following examples.

A parent emulsion is prepared with:

| | Parts |
|---|---|
| Methylpolysiloxanic resin (CH$_3$:Si=1.5:1) 70% solution in toluene | 35 |
| Methylpolysiloxanic oil (CH$_3$:Si=2:1) viscosity 300 cst | 25 |
| Crude triethanolamine titanate | 30 |
| Oleic acid | 0.5 |
| Water | 180 |

This parent emulsion was diluted with water so as to bring its dry solids content to 2% and a cotton poplin fabric treated therewith as in Example I.

One half of the specimen fabric, A, was dried for 10 minutes at 150° C., and the other half, B, for 30 minutes at 100° C.

The ASTM tests gave:

|   | Spray | Pressure |
|---|---|---|
| A | 100 | 15.5 |
| B | 100 | 13.5 |

Example VIII

A parent emulsion was prepared with:

|   | Parts |
|---|---|
| Methylpolysiloxanic oil as in Example VII | 25 |
| Methylpolysiloxanic resin as in Example VII | 35 |
| Crude triethanolamine titanate | 5 |
| Oleic acid | 0.5 |
| Water | 120 |

This parent emulsion is diluted to 2% solids content and a cotton poplin fabric was treated therewith as in Example I.

After drying for 10 minutes at 150° C. the ASTM tests gave: Spray, 100; pressure, 13.5.

Example IX

A parent emulsion having the following composition was prepared:

|   | Parts |
|---|---|
| Methylpolysiloxanic oil as in Example VII | 35 |
| Methylpolysiloxanic resin as in Example VII | 70 |
| Crude triethanolamine titanate | 10 |
| Oleic acid | 0.5 |
| Water | 210 |

This parent emulsion was diluted to 2% solids content and a cotton poplin fabric was treated therewith as in Example I.

After drying for 10 minutes at 150° C., the ASTM tests gave: Spray, 90; pressure, 12.5.

We claim:

1. A water-proofing composition suitable for application to fibrous organic material which comprises an aqueous emulsion containing, calculated on the dry solid content, 20 to 60% by weight of a methyl polysiloxanic resin having a $CH_3:Si$ ratio between 1.3:1 and 1.7:1, 25 to 50% by weight of a methyl polysiloxanic oil having a $CH_3:Si$ ratio between 1.9:1 and 2.1:1 and from 8 to 40% by weight of triethanolamine titanate.

2. A water-proofing composition suitable for application to fibrous organic material which comprises an aqueous emulsion containing, calculated on the dry solid content, 25–50% by weight of a methyl polysiloxanic resin having a $CH_3:Si$ ratio between 1.3:1 and 1.7:1, 25–45% by weight of a methyl polysiloxanic oil having a $CH_3:Si$ ratio between 1.9:1 and 2.1:1 and from 8–20% by weight of triethanolamine titanate.

3. A process for the production of a water-proofing composition suitable for application to fibrous organic material which comprises adding an aqueous solution of triethanolamine titanate to a solution in an organic solvent of a methyl polysiloxanic resin of $CH_3:Si$ ratio between 1.3:1 and 1.7:1 and a methyl polysiloxanic oil of $CH_3:Si$ ratio between 1.9:1 and 2.1:1, and emulsifying the mixture in the presence of an emulsifying agent, the said ingredients being present in the proportions, calculated on the dry solid content of the composition; resin 20–60%, oil 25–50% and titanate 8–40%.

4. A process for the production of a water-proofing composition suitable for application to fibrous organic material which comprises adding an aqueous solution of triethanolamine titanate to a solution in an organic solvent of a methyl polysiloxanic resin of $CH_3:Si$ ratio between 1.3:1 and 1.7:1 and a methyl polysiloxanic oil of $CH_3:Si$ ratio between 1.9:1 and 2.1:1, and emulsifying the mixture in the presence of an emulsifying agent, the said ingredients being present in the proportions, calculated on the dry solid content of the composition; resin 25–50%, oil 25–45% and titanate 8–20%.

5. Organic fibrous material water-proofed by the presence thereon of 0.5 to 6% of its weight of a water-proofing composition comprising, calculated on the dry solid content, 20 to 60% by weight of a methyl polysiloxanic resin having a $CH_3:Si$ ratio between 1.3:1 and 1.7:1, 25 to 50% by weight of a methyl polysiloxanic oil having a $CH_3:Si$ ratio between 1.9:1 and 2.1:1 and from 8 to 40% by weight of triethanolamine titanate.

6. Organic fibrous material water-proofed by the presence thereon of 0.5 to 6% of its weight of a water-proofing composition comprising calculated on the dry solid content, 25–50% by weight of a methyl polysiloxanic resin having a $CH_3:Si$ ratio between 1.3:1 and 1.7:1, 25–45% by weight of a methyl polysiloxanic oil having a $CH_3:Si$ ratio between 1.9:1 and 2.1:1 and from 8:20% by weight of triethanolamine titanate.

7. A method of water-proofing organic fibrous material which comprises applying thereo a composition comprising an aqueous emulsion containing, calculated on the dry solid content, 20 to 60% by weight of a methyl polysiloxanic resin having a $CH_3:Si$ ratio between 1.3:1 and 1.7:1, 25 to 50% by weight of a methyl polysiloxanic oil having a $CH_3:Si$ ratio between 1.9:1 and 2.1:1 and from 8 to 40% by weight of triethanolamine titanate, the said composition being applied to afford an increase in dry weight of the material of 0.5 to 6%, calendering the material and drying it at 100–200° C. for 1 to 30 minutes.

8. A method of water-proofing organic fibrous material which comprises applying thereto a composition comprising, an aqueous emulsion containing, calculated on the dry solid content, 25–50% by weight of a methyl polysiloxanic resin having a $CH_3:Si$ ratio between 1.3:1 and 1.7:1, 25–45% by weight of a methyl polysiloxanic oil having a $CH_3:Si$ ratio between 1.9:1 and 2.1:1 and from 8–20% by weight of triethanolamine titanate, the said composition being applied to afford an increase in dry weight of the material of 0.5 to 6%, calendering the material and drying it at 100–200° C. for 1 to 30 minutes.

No references cited.